(12) United States Patent
Lane et al.

(10) Patent No.: US 10,717,413 B2
(45) Date of Patent: Jul. 21, 2020

(54) ACTUATION OF VEHICLE SYSTEMS USING DEVICE-AS-KEY AND COMPUTER VISION TECHNIQUES

(71) Applicant: VALEO COMFORT AND DRIVING ASSISTANCE, Creteil (FR)

(72) Inventors: Dylan Lane, Danville, CA (US); Shahram Rezaei, Dublin (IE)

(73) Assignee: VALEO COMFORT AND DRIVING ASSISTANCE, Creteil (FR)

(*) Notice: Subject to any disclaimer, the term of this patent is extended or adjusted under 35 U.S.C. 154(b) by 0 days.

(21) Appl. No.: 16/210,944

(22) Filed: Dec. 5, 2018

(65) Prior Publication Data

US 2020/0180561 A1   Jun. 11, 2020

(51) Int. Cl.
*B60R 25/24* (2013.01)
*B60R 25/31* (2013.01)
*G06K 9/00* (2006.01)

(52) U.S. Cl.
CPC ............ *B60R 25/31* (2013.01); *B60R 25/241* (2013.01); *G06K 9/00369* (2013.01); *G06K 9/00791* (2013.01)

(58) Field of Classification Search
CPC .. B60R 25/31; B60R 25/241; G06K 9/00791; G06K 9/00369
See application file for complete search history.

(56) References Cited

U.S. PATENT DOCUMENTS

| 7,821,383 | B2 | 10/2010 | Sultan et al. | |
|---|---|---|---|---|
| 9,696,691 | B2 | 7/2017 | Menard et al. | |
| 9,845,070 | B2 | 12/2017 | Petel et al. | |
| 2006/0177097 | A1* | 8/2006 | Fujimura | G06K 9/00362 382/103 |
| 2013/0090783 | A1* | 4/2013 | Katou | B60R 25/24 701/2 |
| 2015/0184628 | A1* | 7/2015 | Fan | G07C 9/00182 701/2 |

(Continued)

FOREIGN PATENT DOCUMENTS

EP   2 296 126 A1   3/2011

OTHER PUBLICATIONS

Samantha D.F. Hilado, et al., "Vision Based Pedestrian Detection Using Histogram of Oriented Gradients, Adaboost & Linear Support Vector Machines", TENCON 2012 IEEE Region 10 Conference, Jan. 17, 2013, 5 pages.

*Primary Examiner* — Behrang Badii
*Assistant Examiner* — Hossam M Abd El Latif
(74) *Attorney, Agent, or Firm* — Oblon, McClelland, Maier & Neustadt, L.L.P.

(57) ABSTRACT

A method, apparatus and computer readable medium that determine if an authorized mobile device is in a vicinity of a vehicle, upon determination that the authorized mobile device is in the vicinity of the vehicle, capture a plurality of images from an environment surrounding the vehicle, detect one or more pedestrians in the plurality of images, correlate a movement trajectory of the authorized mobile device with movement trajectory of the one or more detected pedestrians to determine an authorized person, and actuate a function of the vehicle when the authorized person crosses a first threshold distance from the vehicle.

20 Claims, 8 Drawing Sheets

(56) References Cited

U.S. PATENT DOCUMENTS

| | | | |
|---|---|---|---|
| 2016/0110572 A1* | 4/2016 | Kalhous | G06K 19/0708 |
| | | | 340/10.1 |
| 2017/0144630 A1* | 5/2017 | Katou | B60R 25/24 |
| 2017/0236351 A1 | 8/2017 | Menard et al. | |
| 2017/0303080 A1 | 10/2017 | Stitt et al. | |
| 2017/0330402 A1 | 11/2017 | Menard et al. | |
| 2017/0334394 A1 | 11/2017 | Menard et al. | |
| 2018/0290627 A1* | 10/2018 | Hariri | B60R 25/245 |

* cited by examiner

ACTUATION OF VEHICLE SYSTEMS USING DEVICE-AS-KEY AND COMPUTER VISION TECHNIQUES

BACKGROUND

Field of Disclosure

The present disclosure relates generally to the field of device-as-key systems for vehicles and computer vision techniques.

It relates more particularly to a control method, a control device, and an apparatus.

It is applied particularly advantageously to a vehicle having surround view camera hardware to provide accurate information of when a pedestrian moves within a predetermined distance of the vehicle.

Description of the Related Art

The following "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

One use for autonomous vehicles is TaaS (Transport as a Service). In this model, a person wishing to travel will request access to a vehicle owned by a third party for the duration of the journey. Service providers will assign seats to passengers allowing entry and exit at the beginning and completion of their journey. One problem service providers have highlighted is how to ensure the correct passenger is assigned to his/her vehicle and to the correct seat in his/her vehicle.

Keyless entry to a vehicle using a mobile device (also called phone-as-key or device-as-key) service is very desirable. Most original equipment manufacturers (OEMs) are pursuing keyless entry using a mobile device. Keyless entry may be restricted to sensors and functionalities that a mobile device's operating system (OS) supports which are accessible by software developers. For instance, there may only be few modes that a mobile phone's operating system permits a software application to run in background (i.e., when screen is off) or be brought to foreground. One of these modes is communications with an external device using Bluetooth Low Energy (BLE). Mobile devices generally include several built-in sensors, such as an accelerometer, a gyroscope, etc., and systems such as Global Navigation Satellite System (GNSS). There is a need in the art for accurately measuring the distance between a vehicle and a person carrying a mobile device.

SUMMARY OF THE INVENTION

According to an embodiment of the present disclosure, there is provided a method, apparatus, and computer-readable medium that determines if an authorized mobile device is in a vicinity of the vehicle, upon determination that the authorized mobile device is in the vicinity of the vehicle, captures a plurality of images from an environment surrounding the vehicle, detects one or more pedestrians in the plurality of images, correlates movement trajectory of the authorized mobile device with movement trajectory of the one or more detected pedestrians to determine an authorized person, and actuates the function of the vehicle when the authorized person crosses a first threshold distance from the vehicle.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
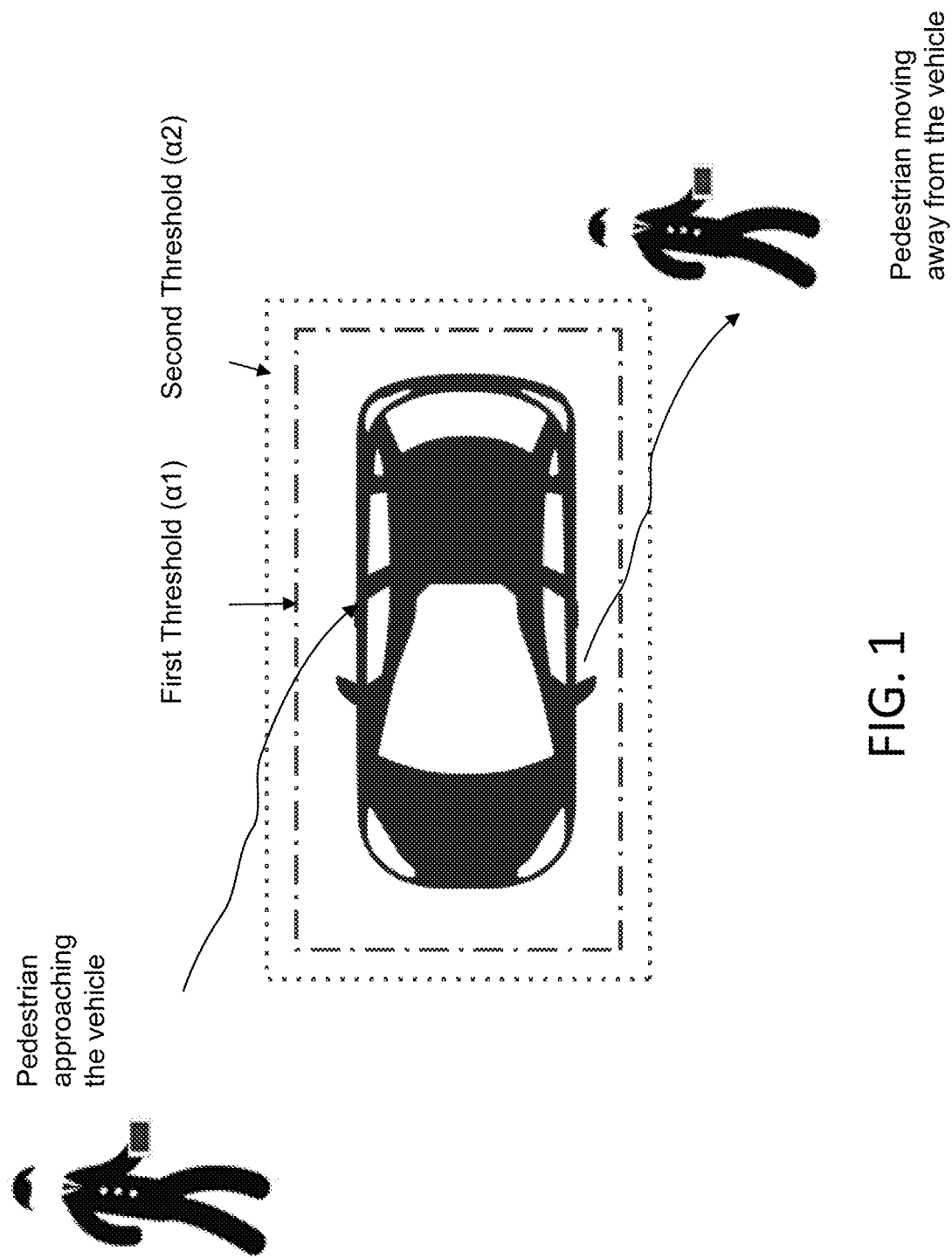
FIG. 1 illustrates example thresholds around a vehicle for an example device as key system.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Furthermore, the terms "approximately," "proximate," "minor," and similar terms generally refer to ranges that include the identified value within a margin of 20%, 10% or preferably 5% in certain embodiments, and any values therebetween.

The term "mobile device" is used herein to refer to any electronic device that can be carried from one place to another and is capable of communicating with other devices wirelessly. The mobile device may include a smartphone, smartwatch, laptop, key fob, tablet (for example, an iPad), wearable device equipped with a computer and communications module, or any other electronic device.

The following description relates to a method, apparatus and computer-readable storage medium using a combination of an imaging device, such as a camera or the like, and a short range radio device for accurate distance estimation, and in particular using the imaging device in combination with the short-range radio device as a low-power solution to accurately estimate distance between an authorized person (e.g., a person carrying an authorized mobile device) and a vehicle in order to activate one or more functions of the vehicle. As used herein, a person having an authorized mobile device is referred to as an authorized person.

In providing Transport as a Service (TaaS), a person may request access to a vehicle and may be assigned a particular seat in a vehicle. In such case, the TaaS vehicle needs to ensure that an authorized person is allowed entry for an assigned seat in a vehicle. These and other actions require a determination of an accurate distance measurement between a person and a section of a vehicle, and an accurate determination of the direction of movement of the person. Techniques for communicating with a mobile device on a person have been used for such services as keyless entry, remote engine start, and opening a vehicle compartment, to name a few. However, use of such communication with a mobile device may not be sufficient for identifying the intensions of a person, and communications with a mobile device may not be sufficient to provide accurate determination of the distance that a person is from a section of the vehicle or the direction that the person is traveling.

One such communication method that involves communication with a mobile device is BLE. BLE may be incorporated into the mobile device. A method for estimating a distance between two devices equipped with BLE transceivers is to measure Received Signal Strength Information (RSSI) of the received BLE signal. RSSI has been used in distance estimation between a mobile device and a BLE transceiver in a device for purposes of triggering passive keyless entry to a vehicle. Upon detection of a distance by RSSI, the keyless entry system automatically unlocks one or more doors of a vehicle.

Referring now to the drawings, wherein like reference numerals designate identical or corresponding parts throughout several views, FIG. 1 illustrates example thresholds around a vehicle for an example device as key system. It is preferred that a vehicle door be unlocked when it is determined that an authorized person intends to enter the vehicle. Such a determination requires accurate measurement of the distance between the authorized person and the vehicle. In general, the keyless entry system should only unlock the vehicle doors if the authorized person is within close proximity of the vehicle and is traveling towards a vehicle door. As an example, a first threshold (e.g., $\alpha 1$) may be defined for unlocking one or more doors of the vehicle. Similarly, when the authorized person moves away from the vehicle and crosses a second threshold (e.g., $\alpha 2$), the keyless entry system should lock the vehicle. The intention of the authorized person cannot be determined based only on the distance measurement made using RSSI, as communications techniques such as RSSI do not provide sufficiently accurate measurements of distance for an authorized person carrying a mobile device and do not provide a reliable determination of the direction that the authorized person is traveling. For example, BLE signal strength can differ due to differences between BLE chips and due to differences in environmental conditions. Also, BLE signal strength decreases as distance between BLE transmitter and receiver increases. As distance increases, accuracy of distance estimation using RSSI decreases due to various effects, such as signal fading, reflection, scattering, multipath, and so on. A vehicle should only be unlocked if the authorized person is moving towards the vehicle and passes the required threshold. Subsequently, proper determination of an authorized person's intentions for operation of the keyless entry system requires distance estimation to the authorized person that has an accuracy of within a few decimeters together with a determination of the direction of travel of the authorized person. It is not possible to achieve this level of accuracy using only BLE signal strength measurements.

Another technique for estimating distance from RSSI information is Fingerprinting. This method is based on using primarily RSSI data to identify the current location using pre-recorded data. The data consists of RSSI readings between two specific BLE devices at different conditions and known locations. However, this method is not practical for vehicle applications, such as keyless entry, because as stated above, RSSI differs from one BLE device to another, thus from one mobile device to another. To collect the fingerprinting data, a person must conduct fingerprinting with his/her mobile device at known or measured locations. This might be inconvenient if the person owns the vehicle, and is very impractical if a person has rented the vehicle for a limited time duration.

Accordingly it is one object of the disclosure to provide a power efficient method using a vision system in combination with the short-range radio device as a low-power solution to accurately estimate an authorized person's location in order to activate one or more functions of the vehicle.

Vehicle vision systems (e.g., cameras and related image processing hardware) may be used to detect a pedestrian or group of pedestrians, but consume a significant amount of power. Thus, vision systems in vehicles are powered while a vehicle is operating. In most vehicles, cameras in the vision system are powered through an internal bus, which is deactivated while the vehicle is off. BLE transceiver systems consume much less power than vehicle cameras. Subsequently, the BLE systems can remain active even when the vehicle is off. Thus, according to one embodiment, a low-power solution for detecting distance between an authorized person having an authorized mobile device and a vehicle is to use a BLE transceiver system in conjunction with a vehicle vision system. The authorized mobile device may perform as a device-as-key system. The vehicle vision system may include one or more cameras. In some embodiments, presence of an authorized mobile device is first detected by the BLE transceiver(s). Upon such detection and a determination that the mobile device is in a vicinity of the vehicle, one or more cameras may be powered on to accurately determine the distance between the person carrying the authorized mobile device and the vehicle and the direction of travel of the person. In one embodiment, the disclosed system leverages surround view camera hardware and algorithms to enhance detection accuracy of the BLE system. Many vehicle types and models are currently equipped with camera systems for driving assistance, parking systems and the like. These cameras can also be used in the disclosed system without any need to add additional hardware in the vehicle. The disclosed system provides a low cost solution by leveraging a surround view camera system and the scene processing techniques available in a vehicle.

The disclosed system may have many applications. Because disclosed embodiments allow for tracking movements of an authorized person with respect to the vehicle, the tracked trajectory can be used for making decisions on actuation of a number of features. For example, disclosed embodiments may be applied as a device-as-key system for keyless entry. Some embodiments may be applied to enhancement of keyless entry systems to perform vehicle configuration tailored to the authorized person (e.g., seat/steering wheel adjustment, vehicle ignition, illumination of safety/puddle lights, cabin environment settings, infotainment system settings, navigation system settings, and other settings that a person would be able to adjust from within a vehicle, etc.). For cases where the authorized person is travelling away from the vehicle, some embodiments may enable alarm activation, deactivation of safety/puddle lights, and the like. In another example, some embodiments may be used to accurately detect and track position of the authorized person with respect to the vehicle, and assign/open a specific door of the vehicle for the authorized person.

In this disclosure, the term vehicle refers to any transportation device that transports people and/or goods. Vehicles may have driver assist functions or may be completely autonomous. Vehicles having driver assist functions or autonomous vehicles may include one or more computer control networks, each of which may consist of interconnected controllers, sensors, and actuators. Typically, the controllers are referred to as electronic control units (ECUs). ECUs may include one or multiple interconnected processors, memory and other hardware. Vehicle sensors may include cameras, ultrasonic sensors, Light detection and ranging (LiDARs), Radars, and any other sensors. Actuators may be used to open/close a door, start/stop operation of a system and the like.

Figure 2:
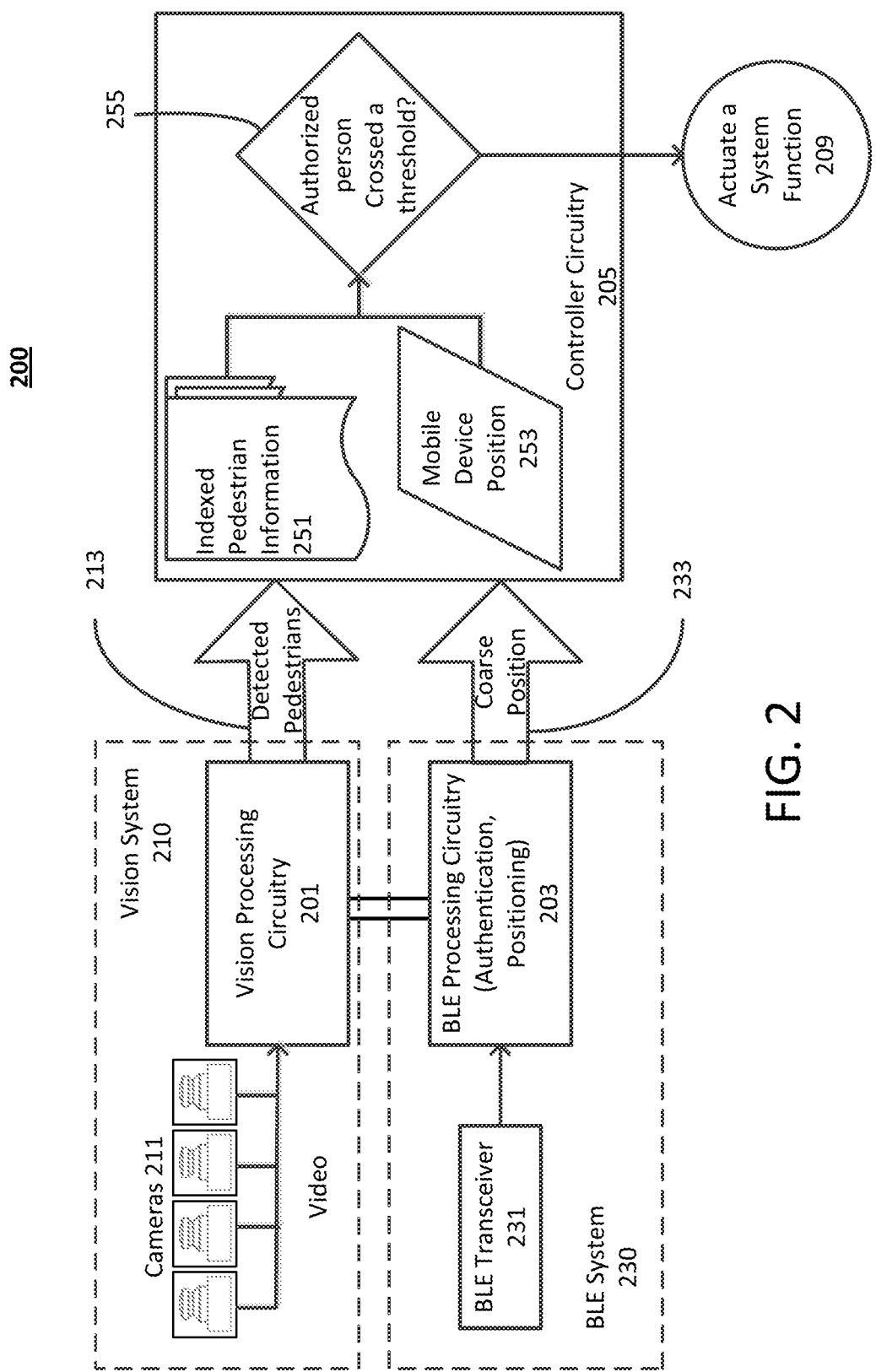
FIG. 2 is a system diagram for a vehicle control system in accordance with an exemplary aspect of the disclosure.

FIG. 2 is a system diagram for a vehicle control system in accordance with an exemplary aspect of the disclosure. The vehicle control system 200 may include circuitry, including vision processing circuitry 201, BLE processing circuitry 203, and controller circuitry 205. The vision processing circuitry 201 may be part of a vision system 210 that includes at least one camera 211. The vision processing circuitry 201 receives video signals from the at least one camera 211 and outputs information of detected pedestrians 213. The BLE processing circuitry 203 may be part of a BLE system 230 that includes at least one BLE transceiver 231. The BLE processing circuitry 203 receives signals from at least one BLE transceiver 231 and outputs coarse position information 233. The controller circuitry 205 assigns an index to the information of detected pedestrians and stores the information as indexed pedestrian information 251, and stores coarse position information as a current mobile device position 253. The controller circuitry 205 obtains indexed pedestrian information 251 and current mobile device position 253 and determines 255 whether an authorized person has crossed a threshold. When the controller circuitry 205 determines that an authorized person has crossed a threshold, a signal is transmitted to actuate at least one system function 209.

Figure 3:
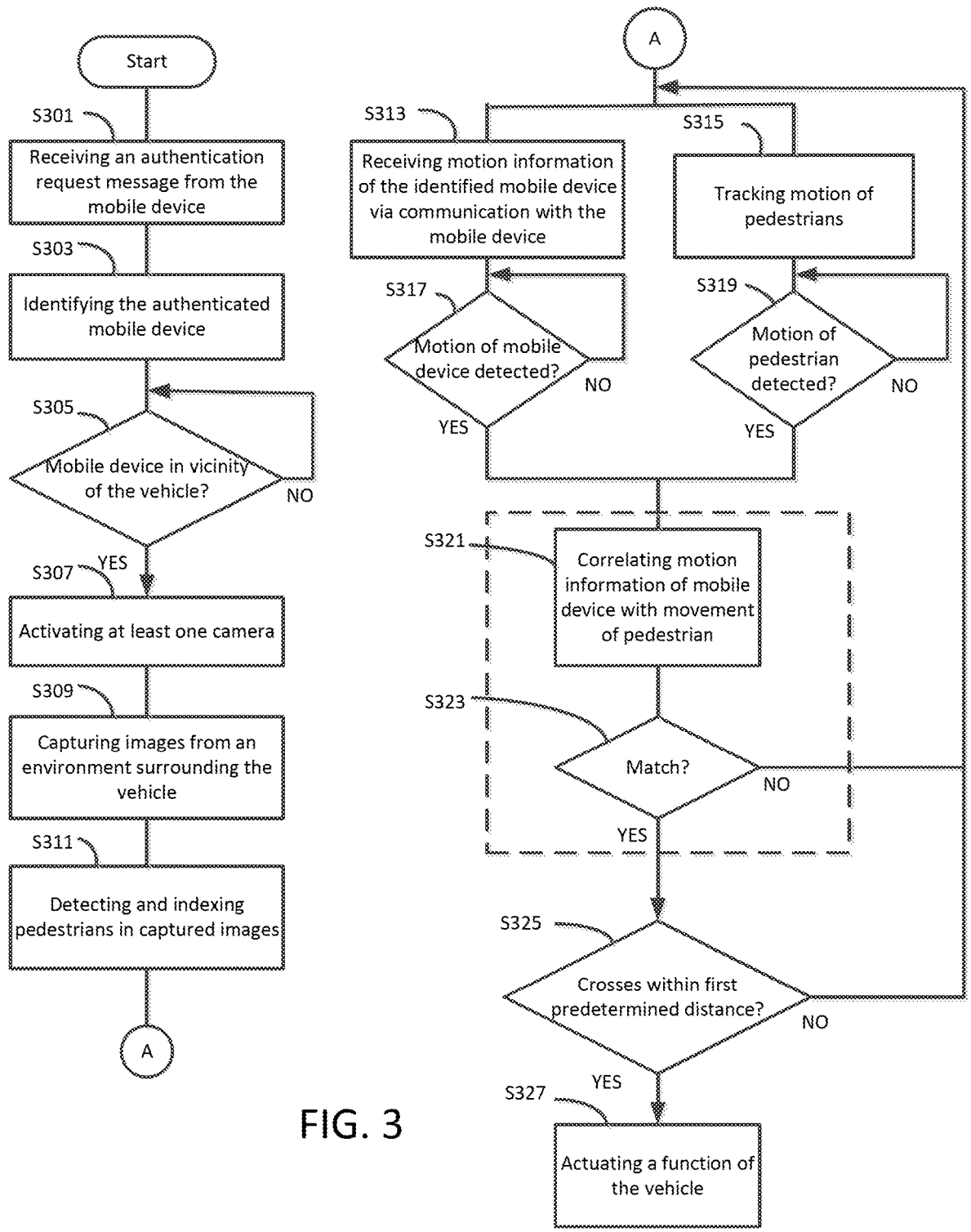
FIG. 3 is a flowchart for a method of performing a vehicle action based on distance in accordance with an exemplary aspect of the disclosure.

FIG. 3 is a flowchart for a method of performing a vehicle action based on distance of the authorized mobile device in accordance with an exemplary aspect of the disclosure. The method may be performed using an existing vehicle control system such as the vehicle control system of FIG. 2. Although the flowchart shows a sequence of steps, the steps are not limited to the sequence shown. Also, some steps may be omitted. For example, authentication of a mobile device may be performed at the time that the mobile device is first detected to be in the vicinity of the vehicle. Also, authentication of the mobile device may be optional. In S301, a BLE transceiver in a vehicle, or at least proximate to an associated vehicle, receives a request message for authentication from a mobile device. As mentioned above, the BLE transceiver 231 may detect a signal from a mobile device that is within a communication range, or, for example, within approximately 100 meters. Other communication protocols may be used to receive an authentication request from a mobile device, such as Bluetooth, Near Field Communication, WiFi, or through the Internet via a satellite service. The mobile device may have previously registered with a vehicle, in which case the mobile device has previously received a vehicle ID broadcasted by the vehicle. The mobile device may include a mobile App which correlates the vehicle ID with the mobile device's authentication key. In S303, the BLE transceiver 231 may undergo an exchange of messages to authenticate and identify the mobile device in response to the authentication request message.

In S305, BLE processing circuitry 203 detects that the identified mobile device has moved into the vicinity of the vehicle, for example, closer than the first threshold (e.g., $\alpha 1$ in FIG. 1). If YES, in S307, upon detecting that the mobile device has moved into the vicinity of the vehicle, the BLE processing circuitry 203 sends a signal to turn on one or more cameras 211, or other imaging device. In general, the first threshold, e.g., $\alpha 1$, or the second threshold, e.g., $\alpha 2$, may be similar or different without departing from the teachings of the present disclosure. In some embodiments, hysteresis may be applied to the first and the second thresholds. For example, the doors may be locked when the person moves away from the vehicle and has a distance of, for example, $\alpha 2$ (e.g., 2.2 m) from the vehicle while unlocking the vehicle is permitted when the person is traveling towards the vehicle and gets closer than $\alpha 1$ (e.g., 2 m) to the vehicle.

The cameras 211 may include Wide Field of View cameras and together with vision processing circuitry 201 provide a driver with augmented visibility around the vehicle. In S309, cameras 211 that have been turned on may begin capturing images. Using vision processing in vision processing circuitry 201, in S311, each pedestrian in the scene may be detected and indexed.

The processing of video frames from these cameras 211 can include scene processing to identify elements of the scene such as tracking pedestrians. For example, pedestrian detection and classification methods have been used in Advanced Driver-Assistance Systems (ADAS). Embedded implementations of these methods using Histogram of Oriented Gradients (HOG) as feature descriptors and adaptive boosting (ADABOOST) and Support Vector Machines as classifiers have been described (see Hilado, Samantha D. F., et al., Vision based pedestrian detection using Histogram of Oriented Gradients, Adaboost & Linear Support Vector Machines, TENCON 2012 IEEE Region 10 Conf., November 2012, pp. 1-5, herein incorporated by reference in its entirety). As an example, in online pedestrian detection, each frame is captured and processed. In each frame, a region of interest is selected by a predetermined estimate of the road. This reduces the area that needs to be furthered processed. Then, from the selected region of interest, a sliding window of pixels is applied. The HOG is computed. This will generate feature vectors which will be classified using AdaBoost. The AdaBoost will classify each window as either pedestrian or non-pedestrian. If the window is a pedestrian, it will verify the classification using Linear Support Vector Machines. The same image vectors fed to the AdaBoost classifier will be fed to the linear SVM classifier, which will classify each window as either a pedestrian or non-pedestrian. This process will continually iterate until the entire region of interest has been scanned. These methods or any other method may be used to identify one or more pedestrians in the vicinity of the vehicle.

These pedestrian detection and classification methods may also be used for tracking pedestrians within the field of view of the camera system. In S315, motion tracking techniques may be used to track the movement of indexed pedestrians (position, direction of travel and speed of travel) with respect to the vehicle.

The indexed list of pedestrians detected by the vision processing system is stored in memory associated with the controller circuitry 205 and updated as pedestrians move within the scene. At the same time, in S313, position information of the authorized mobile device (i.e., the mobile device that is expected to be carried by one of the pedestrians in the camera index list) is also recorded for cross checking with the camera data. As motion of the mobile device is detected (YES in S317) and as motion of pedestrian(s) is detected (YES in S319), in S321, cross-checking identifies the pedestrian that camera and mobile device's positions data match best (YES in S323) to select the authorized person.

Figure 4:
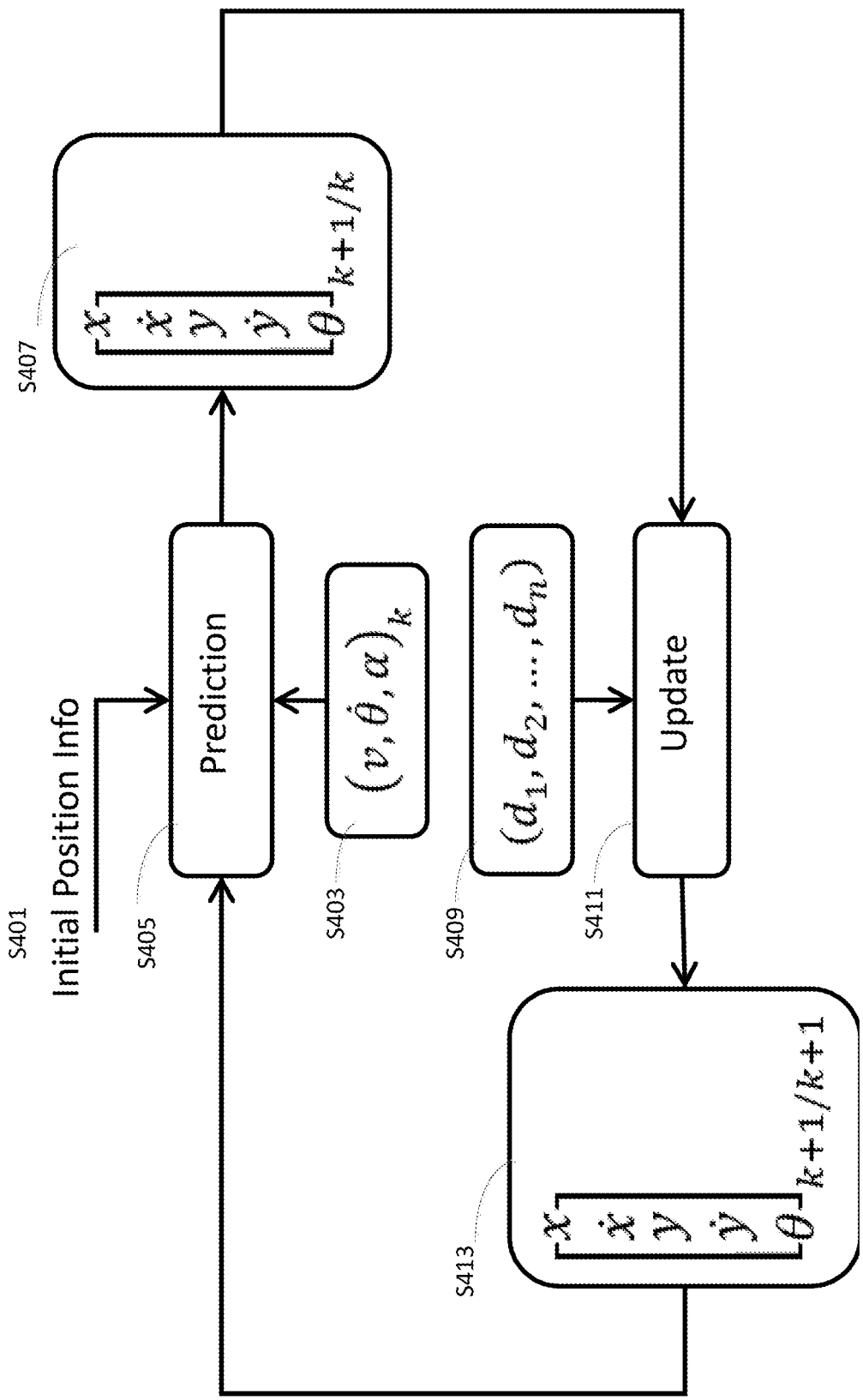
FIG. 4 is data flow diagram for a method of estimating position of a pedestrian.

Different techniques may be used for conducting this cross-check analysis in S321. One technique may be using a Kalman filter for estimating position of pedestrians. FIG. 4 is an example data flow diagram for a method of estimating position of a pedestrian using a Kalman filter. Kalman filter and its variables are shown below:

$$\hat{X}_{k+1/k} = A\hat{X}_{k/k} + Bu_k$$

$$\hat{P}_{k+1/k} = A\hat{P}_{k/k}A^T + Q$$

$$\hat{X}_{k+1/k+1} = \hat{X}_{k+1/k} + K_k(Z_k - H\hat{X}_{k+1/k})$$

$$K_k = \hat{P}_{k+1/k}H^T(H\hat{P}^T_{k+1/k}H^T + R)^{-1}$$

$$\hat{P}_{k+1/k+1} = (I - K_kH)\hat{P}_{k+1/k}$$

k is timestamp index
Δt is time interval between state estimations
k/k indicates value estimated at time k, using information and measurements up to k
k+1/k indicates value predicted at time k+1, using information and measurements up to k
k+1/k+1 indicates value updated at time k+1, using information and measurements up to k+1
X is state vector
P is covariance matrix
A, B are prediction model matrices
H, R are update model matrices
Z is vector containing update measurements
x, y are position values along x and y axes in 2D coordinate system
$\dot{y}$, $\dot{y}$ are velocity values
$\ddot{x}$, $\ddot{y}$ are acceleration values from phone's accelerometer sensor
θ is heading value
$\dot{\theta}$ is heading rate value from phone's gyroscope sensor
^ this symbol (diacritic) above a variable name means estimated value of the variable (by the filter)
d is relative distance of pedestrian from camera system
φ is relative angle of pedestrian from camera system
$\varepsilon_k^d$ is noise in the relative distance measurement at time k
$\varepsilon_k^\varphi$ is noise in the relative angle measurement at time k In one example, the Kalman filter may be implemented as follows:

$$\begin{bmatrix} x \\ \dot{x} \\ y \\ \dot{y} \\ \theta \end{bmatrix}_{k+1/k} = \begin{bmatrix} 1 & \Delta t & 0 & 0 & 0 \\ 0 & 1 & 0 & 0 & 0 \\ 0 & 0 & 1 & \Delta t & 0 \\ 0 & 0 & 0 & 1 & 0 \\ 0 & 0 & 0 & 0 & 1 \end{bmatrix} \times \begin{bmatrix} x \\ \dot{x} \\ y \\ \dot{y} \\ \theta \end{bmatrix}_{k/k} + \begin{bmatrix} \frac{1}{2}\Delta t^2 & 0 & 0 \\ \Delta t & 0 & 0 \\ 0 & \frac{1}{2}\Delta t^2 & 0 \\ 0 & \Delta t & 0 \\ 0 & 0 & \Delta t \end{bmatrix} \times \begin{bmatrix} \ddot{x} \\ \ddot{y} \\ \dot{\theta} \end{bmatrix}_k$$

$$\hat{x}_{k+1/k} = \hat{x}_{k/k} + \hat{\dot{x}}_{k/k} \times \Delta t + \frac{1}{2}\ddot{x}_k \times \Delta t^2$$

$$\hat{y}_{k+1/k} = \hat{y}_{k/k} + \hat{\dot{y}}_{k/k} \times \Delta t + \frac{1}{2}\ddot{y}_k \times \Delta t^2$$

$$\hat{\dot{x}}_{k+1/k} = \hat{\dot{x}}_{k/k} + \ddot{x}_k \times \Delta t$$

$$\hat{\dot{y}}_{k+1/k} = \hat{\dot{y}}_{k/k} + \ddot{y}_k \times \Delta t$$

$$\hat{\theta}_{k+1/k} = \hat{\theta}_{k/k} + \dot{\theta}_k \times \Delta t$$

Regarding FIG. 4, in S401, the controller circuitry 205 receives camera measurements as initial position information for the filter, and in S405, states of the Kalman filter are propagated (predicted) using the mobile device's measurements, and then, in S411, the states are updated using camera measurements. In S403, mobile device measurements including accelerometer (acceleration) and gyroscope measurements (e.g., heading angle and/or change in heading angle) of the mobile device are obtained at discrete points in time. In S409, camera measurements including relative distance and angle of pedestrians are periodically obtained. Predicted (S407) and updated (S413) state information (state vector) includes position, speed, and heading of a pedestrian.

Figure 5:
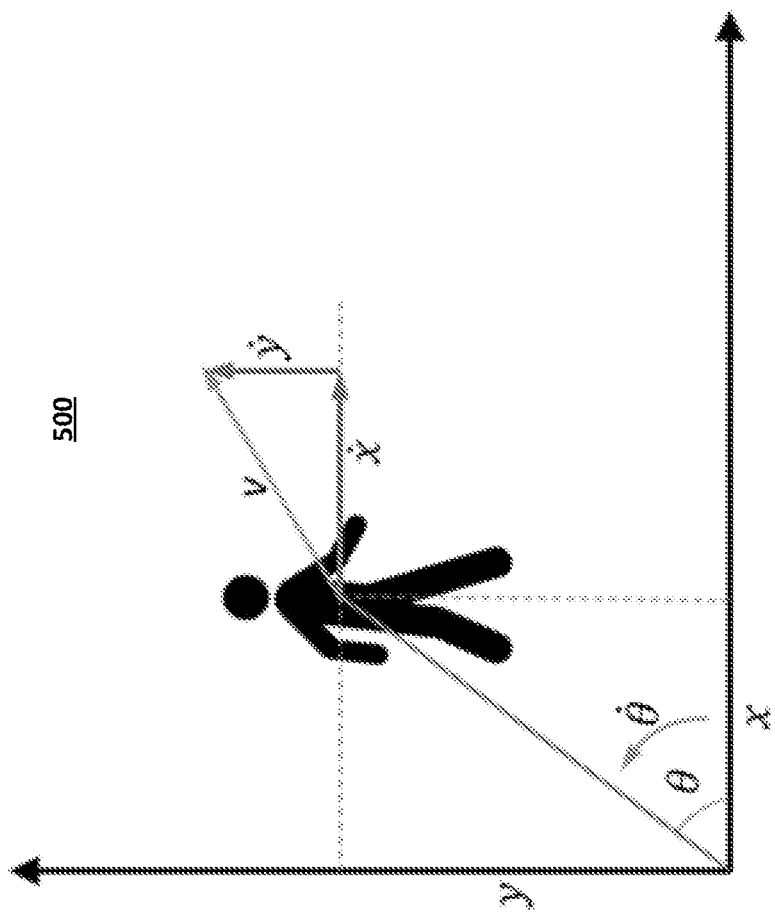
FIG. 5 is a diagram illustrating the state vector of a pedestrian.

FIG. 5 is a diagram illustrating the state vector of a pedestrian. Regarding FIG. 5, the state vector of the pedestrian 500 may consist of 2D (two dimensional) position and speed coordinates plus heading (moving angle). The state vector may contain other variables. For example the state vector may also include altitude, bias and other noise related variables of the sensors (e.g., camera, mobile device's accelerometer and gyroscope, and other mobile device sensor information). The origin of the 2D coordinate system may be chosen to be the center of gravity of the vehicle, a camera location, or a position of a landmark.

Further regarding FIG. 4, the predication (propagation) part of the Kalman filter (S405) uses the mobile device's sensor measurements to predict the state vector at the next time stamp k+1 (S407). The prediction part may involve solving equations for a constant acceleration kinematic model, wherein 'k' is index of the timestamp. Inputs to this model are x and y, velocity and acceleration from the accelerometer, and heading rate from the gyroscope. These input values (S403) may be derived using raw measurements of the accelerometer and gyroscope.

Figure 6:
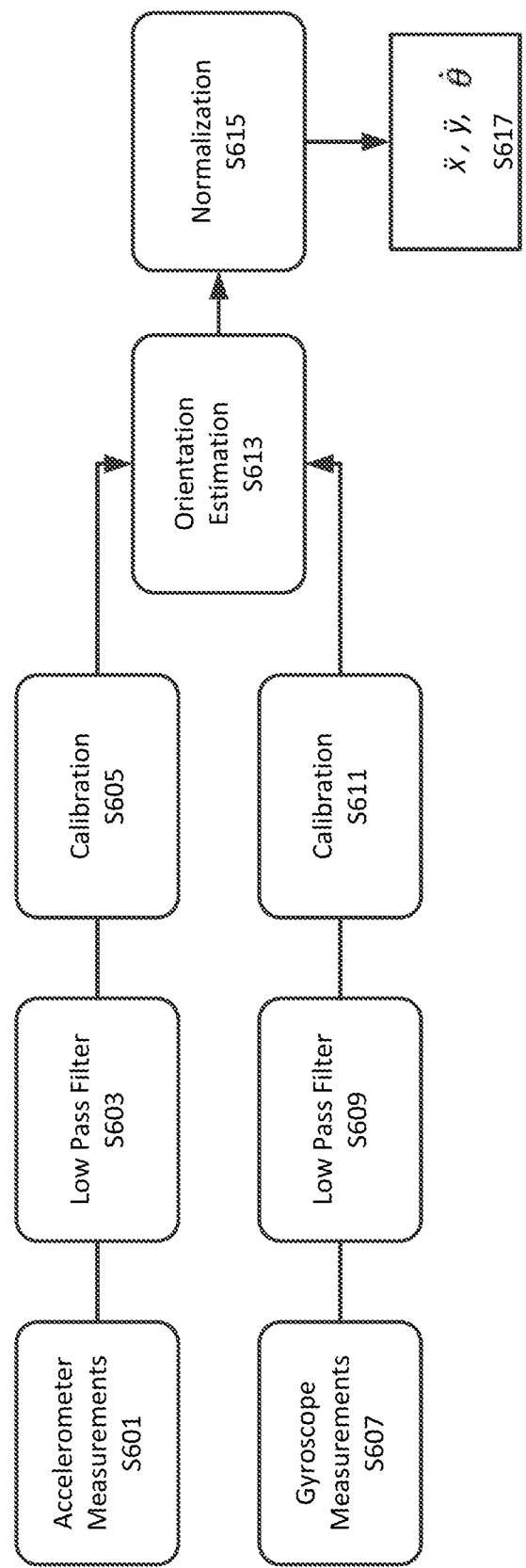
FIG. 6 is a data flow diagram for a method of predicting a pedestrian state vector using measurements from a mobile device's sensors in accordance with an exemplary aspect of the disclosure.

FIG. 6 is a data flow diagram for a method of deriving the kinematic model input values using measurements from a mobile device's sensors in accordance with an exemplary aspect of the disclosure. The raw measurement processing may involve, in S601, obtaining accelerometer measurements, in S607, obtaining gyroscope measurements, in S603 and S609, performing low pass filtering of each of the measurements, in S605 and S611, calibrating each filtered measurement, in S613, estimating orientation of the mobile device using the calibrated results, and, in S615, normalizing the measurements, including transforming the measurements into the coordinate system, e.g., the resulting coordinate system ẍ, ÿ, θ̇ in S617, of the Kalman filter.

Further regarding FIG. 4, the update part of the filter (S411) may use camera measurements (S409) to update the state vector (S413). These measurements may be represented at distance d and relative angle φ of the pedestrian, as seen in equations as follows.

$$d(k+1)=\sqrt{\hat{x}_{k+1/k}^2+\hat{y}_{k+1/k}^2}+\varepsilon_{k+1}^d$$

$$\varphi(k+1)=\tan^{-1}(\hat{y}_{k+1/k}/\hat{x}_{k+1/k})+\varepsilon_{k+1}^\varphi$$

In one embodiment, the prediction part of the filter (S405) uses the same mobile device measurements for all the indexed pedestrians. But, the update part (S411) is preferably specific to each indexed pedestrian. In one embodiment, if there are five pedestrians in the scene, five copies of the Kalman filter will be running, each trying to estimate the state vector of one pedestrian, using the mobile device and the relevant camera measurements. In another embodiment, a single Kalman filter may be used to estimate state vectors of all the pedestrians.

In one embodiment, in S321 (FIG. 3), a Kalman filter may also be used to estimate a covariance matrix for the state vector that represents the uncertainty (error) in the states estimated. The covariance matrix (metric or metrics related to it) could be used to identify the authorized person. This covariance matrix would be stable and bounded (may be under some conditions) for the pedestrian that carries the mobile device, because mobile device and camera measurements would be consistent. For other pedestrians, correlation decreases as pedestrians move around. In particular, the state covariance matrix P is determined for each pedestrian. In S323 (FIG. 3), the covariance for each of the pedestrians will be checked against each other and the one with lowest error is selected.

Further regarding FIG. 3, once the relevant pedestrian's position and motion has been confirmed using the methods above (YES in S323 in FIG. 3), the pedestrian detection algorithm can provide accurate information on when the authorized person passes through the threshold (S325) for activating a function of the vehicle and send this information to the vehicle computer control system and, in S327, activate the function. This information may also contain traveling direction of the authorized person in order to identify the specific vehicle door that the authorized person is approaching.

The pedestrian detection algorithm of FIG. 3 detects when an authorized person carrying a mobile device moves into a zone that is within a threshold distance of a vehicle in order to activate one or more functions of the vehicle. In a similar manner, a function that has been activated may be deactivated. Some or all of the vehicle functions may be deactivated when an authorized person carrying the mobile device moves out of the zone.

Figure 7:
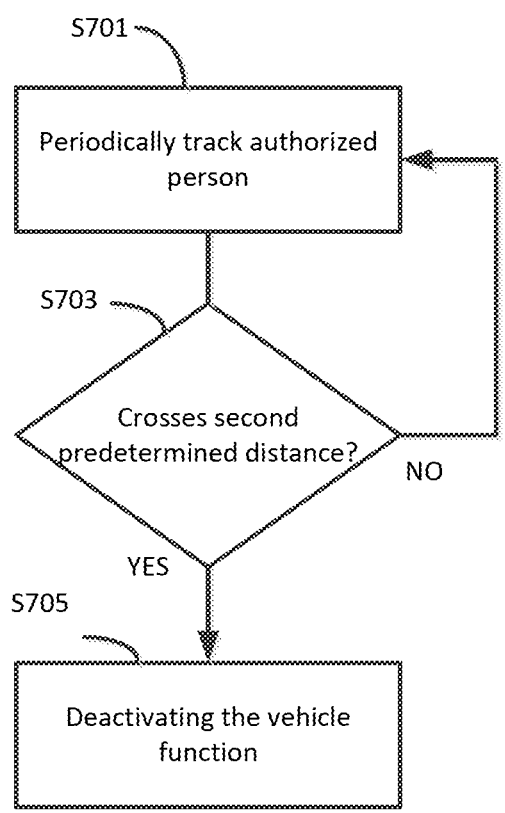
FIG. 7 is a flowchart for further steps in the method of FIG. 3 in accordance with an exemplary aspect of the disclosure.

FIG. 7 is a flowchart for further steps in the method of FIG. 3 in accordance with an exemplary aspect of the disclosure. In particular, in S701, the vehicle control system 200 may monitor the authorized person over time, and when the authorized person moves to a predetermined distance (YES in S703), in S705, one or more functions of the vehicle may be activated and/or deactivated. The predetermined distance may be the same distance that was used as a threshold for first activating vehicle functions, or may be a greater distance from the vehicle. In one embodiment, the predetermined distance for locking the vehicle door after an authorized person moves away from a vehicle can be equal to the second threshold. Also, the decision (S703) that an authorized person has passed a predetermined distance away from a vehicle may be subject to a time delay to avoid fluctuations between activating and deactivating functions of a vehicle. In one embodiment, a time delay before a vehicle function is deactivated can be in a range of a few seconds.

As mentioned above, functions of a vehicle that may be controlled by a person while seated inside a car may also be activated in response to movement of an authorized person, having a device-as-key, to within a certain distance from the vehicle. The types of functions that may be performed may include starting/stopping the vehicle engine, starting/stopping an air conditioner or heater, activating/deactivating an alarm, unlocking/locking a locker compartment of a vehicle, unlocking/locking the vehicle doors, setting configuration such as seat position, air conditioning temperature, activating seat warming, setting a user interface and initial channels for an infotainment system, setting up a map for a navigation system, and any other functions.

Accordingly, a proper function of the vehicle may be activated by coarsely determining that an authorized person has moved to within a distance of a vehicle using the BLE system 230 then detecting and determining that the authorized person has moved to within a predetermined threshold distance of the vehicle with great accuracy using the vision system 210.

Figure 8:
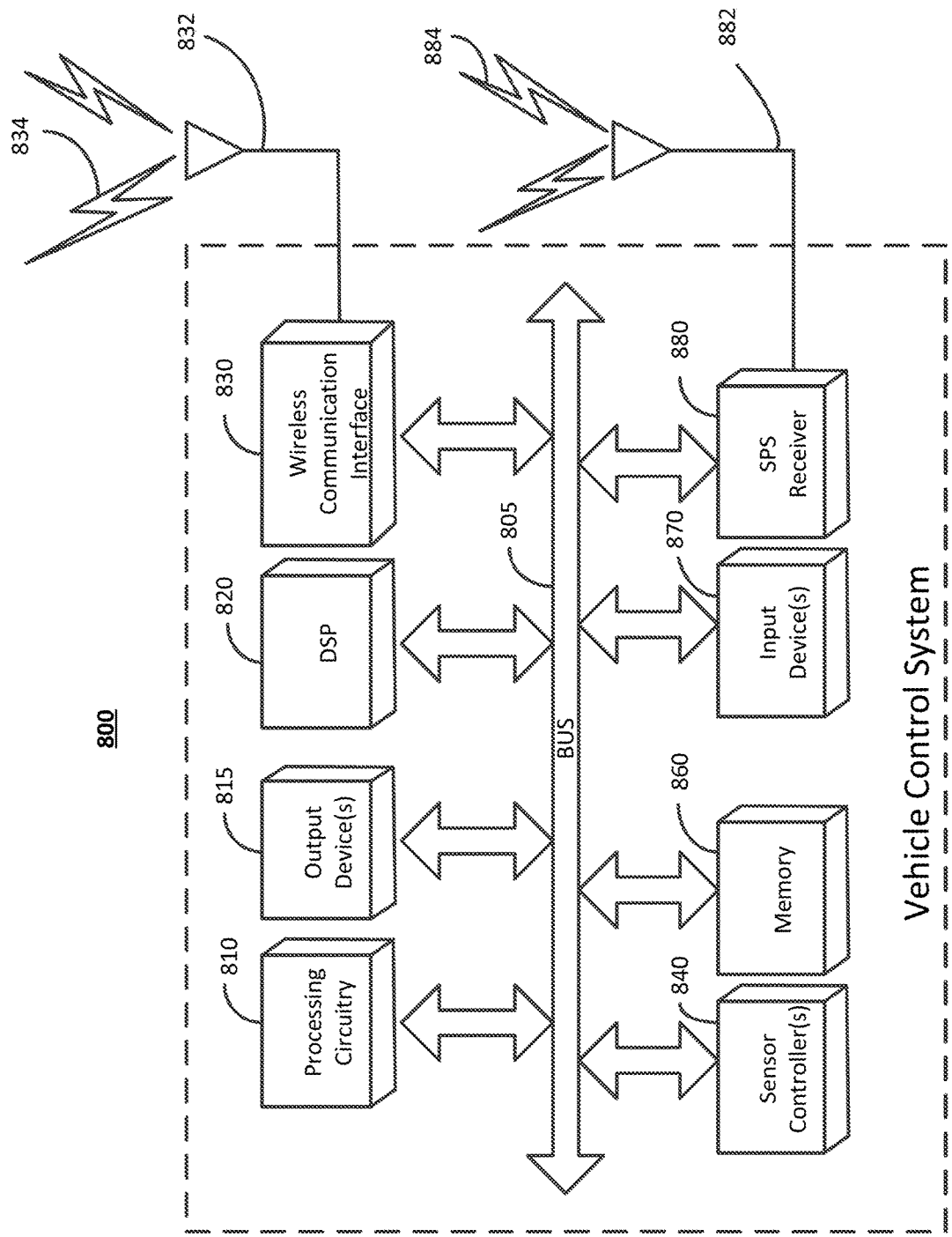
FIG. 8 is a block diagram of internal components of a vehicle control system that may be implemented according to an embodiment.

FIG. 8 is a block diagram of internal components of a vehicle control system that may be implemented according to an embodiment. For instance, vehicle control system 800 may represent an implementation of the vehicle control system 200 of FIG. 2. The controller circuitry 205, the vision processing circuitry 201, or the BLE processing circuitry 203, may be implemented in the vehicle control system 200, or the vision processing circuitry 201 and the BLE processing circuitry 203 may be separate devices. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations.

The vehicle control system 800 is shown including hardware elements that can be electrically coupled via a bus 805 (or may otherwise be in communication, as appropriate). The hardware elements may include processing circuitry 810 which can include without limitation one or more processors, one or more special-purpose processors (such as digital signal processing (DSP) chips, graphics acceleration processors, application specific integrated circuits (ASICs), and/or the like), and/or other processing structure. Some embodiments may have a separate DSP 820, depending on desired functionality. The vehicle control system 800 also can include one or more input device controllers 870, which can control without limitation an in-vehicle touch screen, a touch pad, microphone, button(s), dial(s), switch(es), and/or the like; and one or more output device controllers 815, which can control without limitation a display, light emitting diode (LED), speakers, and/or the like.

The vehicle control system 800 might also include a wireless communication interface 830, which can include without limitation a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication interface 830 may permit data to be exchanged with a network, wireless access points, other computer systems, and/or any other electronic devices described herein. The communication can be carried out via one or more wireless communication antenna(s) 832 that send and/or receive wireless signals 834.

Depending on desired functionality, the wireless communication interface 830 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on, including 4G and 5G technologies.

The vehicle control system 800 can further include sensor controller(s) 840. Such controllers can control, without limitation, one or more accelerometer(s), gyroscope(s), camera(s), RADAR(s), LiDAR(s), Ultrasonic sensor(s), magnetometer(s), altimeter(s), microphone(s), proximity sensor(s), light sensor(s), and the like.

Embodiments of the vehicle control system 800 may also include a Satellite Positioning System (SPS) receiver 880 capable of receiving signals 884 from one or more SPS satellites using an SPS antenna 882. The SPS receiver 880 can extract a position of the device, using conventional techniques, from satellites of an SPS system, such as a global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 880 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The vehicle control system 800 may further include and/or be in communication with a memory 860. The memory 860 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 860 of the vehicle control system 800 also can comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special purpose computer.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

The above disclosure also encompasses the embodiments listed below.

(1) A method for actuating a function of a vehicle, including determining if an authorized mobile device is in a vicinity of the vehicle, upon determination that the authorized mobile device is in the vicinity of the vehicle, capturing a plurality of images from an environment surrounding the vehicle, detecting one or more pedestrians in the plurality of images, correlating movement trajectory of the authorized mobile device with movement trajectory of the one or more detected pedestrians to determine an authorized person, and actuating the function of the vehicle when the authorized person crosses a first threshold distance from the vehicle.

(2) The method of (1), wherein determining if the authorized mobile device is in the vicinity of the vehicle comprises: receiving an authentication request message from a mobile device, wherein the mobile device has previously verified a vehicle ID broadcasted by the vehicle in its vicinity corresponds to the mobile device's authentication key, and identifying the authorized mobile device based on the authentication request message.

(3) The method of either (1) or (2), wherein the plurality of images correspond to a sequence of video frames captured by one or more cameras.

(4) The method of any of (1) to (3), wherein the one or more pedestrians are detected using a computer vision algorithm.

(5) The method of any of (1) to (4), wherein the authorized person is determined using a Kalman filter.

(6) The method of (5), wherein the Kalman filter receives position information of the authorized mobile device and the one or more detected pedestrians over a period of time.

(7) The method of any of (1) to (6), further comprising tracking movement of the authorized person to determine when the authorized person crosses the first threshold distance.

(8) The method of any of (1) to (7), wherein the function of the vehicle corresponds to unlocking one or more doors of the vehicle.

(9) The method of any of (1) to (8), further comprising activating one or more cameras of the vehicle to capture the plurality of images of the environment.

(10) The method of any of (1) to (9), further comprising deactivating the function of the vehicle when the distance between the authorized person and the vehicle is greater than a second threshold distance, wherein position of the authorized person is tracked until the authorized person reaches the second threshold distance.

(11) An apparatus for actuating a function of a vehicle, comprising processing circuitry configured to determine if an authorized mobile device is in a vicinity of the vehicle, upon determination that the authorized mobile device is in the vicinity of the vehicle, capture a plurality of images from an environment surrounding the vehicle, detect one or more pedestrians in the plurality of images, correlate movement trajectory of the authorized mobile device with movement trajectory of the one or more detected pedestrians to determine an authorized person, and actuate the function of the vehicle when the authorized person crosses a first threshold distance from the vehicle.

(12) The apparatus of (11), wherein determining if the authorized mobile device is in the vicinity of the vehicle, the processing circuitry is further configured to receive an authentication request message from a mobile device, wherein the mobile device has previously verified a vehicle ID broadcasted by the vehicle in its vicinity corresponds to the mobile device's authentication key, and identify the authorized mobile device based on the authentication request message.

(13) The apparatus of either (11) or (12), further comprising one or more cameras configured to capture a sequence of video frames as the plurality of images.

(14) The apparatus of any of (11) to (13), wherein the processing circuitry uses a computer vision algorithm to detect the one or more pedestrians.

(15) The apparatus of any of (11) to (14), wherein the processing circuitry uses a Kalman filter to determine the authorized person.

(16) The apparatus of (15), wherein the Kalman filter receives position information of the authorized mobile device and the one or more detected pedestrians over a period of time.

(17) The apparatus of any of (11) to (16), wherein the processing circuitry is further configured to track movement of the authorized person to determine when the authorized person crosses the first threshold distance.

(18) The apparatus of any of (11) to (17), wherein the function of the vehicle corresponds to unlocking one or more doors of the vehicle.

(19) The apparatus of any of (11) to (18), wherein the processing circuitry is further configured to deactivate the function of the vehicle when the distance between the authorized person and the vehicle is greater than a second threshold distance, and track the position of the authorized person until the authorized person reaches the second threshold distance.

(20) A non-transitory computer readable storage medium storing instructions, which when executed by a computer perform a method for actuating a function of a vehicle, comprising determining if an authorized mobile device is in a vicinity of the vehicle, upon determination that the authorized mobile device is in the vicinity of the vehicle, capturing a plurality of images from an environment surrounding the vehicle, detecting one or more pedestrians in the plurality of images, correlating movement trajectory of the authorized mobile device with movement trajectory of the one or more detected pedestrians to determine an authorized person, and actuating the function of the vehicle when the authorized person crosses a first threshold distance from the vehicle.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A method for actuating a function of a vehicle, comprising:

determining if an authorized mobile device is in a vicinity of the vehicle;

capturing, upon determination that the authorized mobile device is in the vicinity of the vehicle, a plurality of images of an environment surrounding the vehicle;

detecting one or more pedestrians in the plurality of images;

determining an authorized person of the one or more detected pedestrians based on a correlation between a movement trajectory of the authorized mobile device and a movement trajectory of each of the one or more detected pedestrians; and actuating the function of the vehicle when the determined authorized person crosses a first threshold distance from the vehicle.

2. The method of claim 1, wherein the determining if the authorized mobile device is in the vicinity of the vehicle further comprises
receiving an authentication request message from a mobile device, wherein the mobile device has previously verified a vehicle ID broadcasted by the vehicle in its vicinity corresponds to an authentication key of the mobile device; and
identifying the authorized mobile device based on the received authentication request message.

3. The method of claim 1, wherein the plurality of images correspond to a sequence of video frames captured by one or more cameras.

4. The method of claim 1, wherein the detecting detects the one or more pedestrians via a computer vision algorithm.

5. The method of claim 1, wherein the determining determines the authorized person via a Kalman filter.

6. The method of claim 5, wherein the Kalman filter receives position information of the authorized mobile device and the one or more detected pedestrians over a period of time.

7. The method of claim 1, further comprising
tracking a position of the determined authorized person to determine when the determined authorized person crosses the first threshold distance.

8. The method of claim 1, wherein the function of the vehicle corresponds to unlocking one or more doors of the vehicle.

9. The method of claim 1, further comprising
activating one or more cameras of the vehicle to capture the plurality of images.

10. The method of claim 1, further comprising
deactivating the function of the vehicle when a distance between the determined authorized person and the vehicle is greater than a second threshold distance, wherein a position of the determined authorized person is tracked until the determined authorized person reaches the second threshold distance.

11. An apparatus for actuating a function of a vehicle, comprising:
processing circuitry configured to
determine if an authorized mobile device is in a vicinity of the vehicle,
capture upon determination that the authorized mobile device is in the vicinity of the vehicle, a plurality of images of an environment surrounding the vehicle,
detect one or more pedestrians in the plurality of images,
determine an authorized person of the one or more detected pedestrians based on a correlation between a movement trajectory of the authorized mobile device with and a movement trajectory of each of the one or more detected pedestrians, and
actuate the function of the vehicle when the determined authorized person crosses a first threshold distance from the vehicle.

12. The apparatus of claim 11, wherein the processing circuitry is configured to determine if the authorized mobile device is in the vicinity of the vehicle by
receiving an authentication request message from a mobile device that has previously verified a vehicle ID broadcasted by the vehicle in its vicinity corresponds to an authentication key of the mobile device, and
identifying the authorized mobile device based on the received authentication request message.

13. The apparatus of claim 11, further comprising
one or more cameras wherein
the processing circuitry is configured to capture, as the plurality of images, a sequence of video frames via the one or more cameras.

14. The apparatus of claim 11, wherein the processing circuitry is configured to detect the one or more pedestrians via a computer vision algorithm.

15. The apparatus of claim 11, wherein the processing circuitry is configured to determine the authorized person via a Kalman filter.

16. The apparatus of claim 15, wherein the Kalman filter receives position information of the authorized mobile device and the one or more detected pedestrians over a period of time.

17. The apparatus of claim 11, wherein the processing circuitry is configured to
track movement of the determined authorized person to determine when the determined authorized person crosses the first threshold distance.

18. The apparatus of claim 11, wherein the function of the vehicle corresponds to unlocking one or more doors of the vehicle.

19. The apparatus of claim 11, wherein the processing circuitry is configured to
deactivate the function of the vehicle when a distance between the determined authorized person and the vehicle is greater than a second threshold distance, and
track a position of the determined authorized person until the determined authorized person reaches the second threshold distance.

20. A non-transitory computer readable storage medium storing instructions, which when executed by a computer, perform a method for actuating a function of a vehicle, comprising:
determining if an authorized mobile device is in a vicinity of the vehicle;
capturing, upon determination that the authorized mobile device is in the vicinity of the vehicle, a plurality of images of an environment surrounding the vehicle;
detecting one or more pedestrians in the plurality of images;
determining an authorized person of the one or more detected pedestrians based on a correlation between a movement trajectory of the authorized mobile device and a movement trajectory of each of the one or more detected pedestrians; and
actuating the function of the vehicle when the determined authorized person crosses a first threshold distance from the vehicle.

* * * * *